United States Patent
Gerigk

[19]
[11] Patent Number: 6,056,292
[45] Date of Patent: May 2, 2000

[54] SHAFT SEAL AND METHOD FOR MANUFACTURING IT

[75] Inventor: Hans-Willi Gerigk, Oberhausen, Germany

[73] Assignee: TRW Fahrwerksysteme GmbH & Co. KG, Dusseldorf, Germany

[21] Appl. No.: 09/011,953

[22] PCT Filed: Jun. 21, 1997

[86] PCT No.: PCT/EP97/03260

§ 371 Date: May 1, 1998

§ 102(e) Date: May 1, 1998

[87] PCT Pub. No.: WO97/49940

PCT Pub. Date: Dec. 31, 1997

[30]     Foreign Application Priority Data

Jun. 22, 1996 [DE] Germany ................. 196 25 011

[51] Int. Cl.[7] ................................................ F16J 15/32
[52] U.S. Cl. ...................................... 277/549; 277/560
[58] Field of Search .................................. 277/549, 560, 277/562, 576, 552

[56]            References Cited

U.S. PATENT DOCUMENTS

| | | |
|---|---|---|
| 3,183,009 | 5/1965 | Kunel . |
| 3,927,600 | 12/1975 | Peisker . |
| 3,929,340 | 12/1975 | Peisker . |
| 4,102,538 | 7/1978 | Bertin . |
| 4,336,945 | 6/1982 | Christiansen et al. . |
| 4,387,902 | 6/1983 | Conover . |
| 5,143,385 | 9/1992 | Sponagel et al. . |
| 5,195,757 | 3/1993 | Dahll, V . |
| 5,271,629 | 12/1993 | Dahlhaus et al. . |
| 5,328,178 | 7/1994 | Nies . |

FOREIGN PATENT DOCUMENTS

| | | |
|---|---|---|
| 1750230C2 | 4/1972 | Germany . |
| 2264042 | 7/1973 | Germany . |
| 7616124 | 5/1976 | Germany . |
| 2835359C2 | 6/1987 | Germany . |
| 3830706 | 3/1990 | Germany . |
| 4012160A1 | 10/1991 | Germany . |
| 4200927A1 | 8/1992 | Germany . |
| 4443422A1 | 6/1996 | Germany . |

OTHER PUBLICATIONS

*Fortschritte in der Dichtungstechnik*, In: *Kugellager–Zeitschrift*, 242, S. 27–31.

Primary Examiner—Anthony Knight
Attorney, Agent, or Firm—Tarolli, Sundheim, Covell, Tummino & Szabo L.L.P.

[57]              ABSTRACT

A shaft seal seals a shaft in a hydraulic steering valve. The seal is a sealing ring surrounding the shaft. The sealing ring has a sealing edge contacting the outer surface of the shaft to form a seal. The sealing edge extends circumferentially around the outer surface of the shaft in a sinusoidal fashion. The sealing ring has first and second surfaces which extend radially outward from the sealing edge and which diverge relative to each other as they extend radially outward from the sealing edge. The first and second surfaces extend entirely circumferentially around the outer surface of the shaft. The first surface extends at a constant first angle relative to said sealing edge throughout the entire circumferential extent of the first surface and the second surface extends at a constant second angle relative to the sealing edge throughout the entire circumferential extent of the second surface.

9 Claims, 1 Drawing Sheet

SHAFT SEAL AND METHOD FOR MANUFACTURING IT

FIELD OF THE INVENTION

The invention relates to a shaft seal, particularly a seal for the shaft of a hydraulic steering valve, having a sealing ring zone surrounding the shaft and, located on the shaft side of the sealing ring zone, at least one sealing edge which contacts the shaft to form a seal in the region of an annular sealing surface defining a radial plane which lies essentially at right angles to the longitudinal center axis of the shaft, wherein the sealing edge, of which there is at least one, has a contour such that it intersects the annular sealing surface several times. The invention furthermore relates to a method for manufacturing such a shaft seal.

DESCRIPTION OF RELATED ART

Generic shaft seals of the described type are known per se. One of the preferred applications for such seals is in hydraulic steering valves. Hydraulic steering valves, such as rotary disk valves, are known per se. An input shaft and an output shaft that is connected with the input shaft by means of a torsionally elastic element, typically a torque rod, are arranged in a housing. The output shaft engages with the rack of a steering gear via a pinion. Normally, a valve sleeve surrounding the input shaft is connected with the output shaft. Hydraulic fluid is supplied to the corresponding steering ducts through steering bores via connections disposed on the side the housing.

In this type of power-assisted steering valves, shaft seals of the aforementioned type are used. Such seals typically comprise an outer sealing ring zone which is made in such a way that the shaft seal can be fixed relative to the shaft in its housing or to another component. Typically, the sealing ring zone is made of an elastic material with an annular embedding for reinforcement which can also be an elastic element. Normally, at least one sealing edge, which forms a single component together with the elastic material, is disposed on the sealing ring zone pointing toward the shaft. In practice, this sealing edge forms a ring surrounding the shaft, which is usually very small in axial direction, i.e., it takes the form of a ridge. There is typically no drag flow in the direction of the sealing edge, and thus the seal surface, as a function of the system. The seal surface is an imaginary annular surface along the outer contour of a shaft along which the sealing edge contacts the shaft to form a seal. In the absence of drag flow, this may result in inadequate lubrication of the seal surface, particularly in fast rotating shafts. This significantly increases mechanical and thermal stress which is due, among other things, to the fact that there is no fluid exchange in the seal surface or the seal gap. Normally, the sealing edge lies in a plane perpendicular to the shaft axis. Here, lubrication depends on complicated flow processes due to the interaction between microscopic roughnesses and the viscoelastic seal material. To improve lubrication in rotating shafts under unfavorable lubricant flow conditions, it has previously been proposed to arrange an O-ring at an angle to the shaft axis. The use of an O-ring lying at an angle to the shaft axis produces additional friction and also does not permit tolerances, that is, no eccentricity compensation is possible. In fast turning shafts, the seals float and lubrication occurs as a result of what is known as hydrodynamic friction. However, this does not occur with slow moving shafts, for example, those used in power-assisted steering systems.

Characteristic for the steering valve application is the lack of lubrication between the shaft and the seal which occurs because of the slow speeds and the lack of drag flow in the contact area of shaft and seal. This can create undesirably high friction and result in stick slip phenomena including noise.

DE 22 64 042 A1 discloses a shaft seal for fast moving shafts. This seal is made in such a way that the sinusoidal seal edge is formed when the seal portion made of elastic material is manufactured. Since the sealing edge sinusoidally migrates in axial direction and should have a constant diameter in order to create constant pressure conditions, the angles on either side of the sealing edge element are continuously changing. This negatively influences the sealing mechanism which is substantially determined by the two angles. DE 38 30 706 A1 also discloses a shaft seal for fast rotating shafts. Here, the sealing edge is also formed in such a way that it extends sinusoidally in axial direction while creating a constant diameter, but the sealing edge angles are kept constant on both sides around the entire circumference. The sealing edge is not very high and capillary active clearance spaces are formed on both sides of the sealing edge. These are used to maintain adequate lubrication of the sealing element which is intended for fast rotating shafts. While constant sealing edge angles on both sides are required for generic shaft seals to obtain a defined sealing characteristic, the capillary active clearance spaces on both sides of the sealing edge are disadvantageous for the pressure sealing of slow moving shafts, particularly shafts of steering gears. This is because here, in contrast to the application in fast rotating shafts, the area of the seal surface does not lift or float but instead, when pressure is acting on the shaft seal, which normally does not occur but is the case here, the area of the seal surface is substantially pressed against the shaft. Any capillary active clearance spaces are eliminated when pressure is acting and the contact area between seal and shaft increases substantially. Thus, lubrication in this area decreases, the intended drag flow can no longer take place and, as a result, friction, wear and noise increase.

SUMMARY OF THE INVENTION

Based on this state of the art, it is the object of the invention to improve a generic type shaft seal to permit improved lubrication of the seal surface in order to reduce frictional torques, noise and/or stick slip phenomena.

It is a further object of the invention to define a method for manufacturing such a shaft seal.

To attain this object with respect to the manufacturing process, the invention proposes a method for manufacturing a shaft seal, particularly for shafts of a hydraulic steering valve, with a sealing ring zone surrounding the shaft and, located on the shaft side of the sealing ring zone, at least one sealing edge which contacts the shaft to form a seal in the region of an annular sealing surface defining a radial plane which lies essentially at right angles to the longitudinal center axis of the shaft, the sealing edge having a shape such that it intersects the annular sealing surface several times. The sealing edge has a constant inside diameter and pressure angles which are constant on both sides over the entire circumference and is formed on a cylindrical base which is made on the inner circumference of the sealing ring zone with a width corresponding at least to the width of the axial extent of the sealing edge. The cylindrical base in the area of the adjacent surfaces next to the sealing edge is designed so that, from the interior of the sealing edge, it is at least partially spaced apart in such a way that these surfaces cannot contact the shaft when pressure is acting.

The manufacturing method according to the invention makes it possible on the one hand to produce a sealing edge with constant pressure angles on both sides over the entire circumference, which need not necessarily be symmetrical, and on the other hand to prevent the occurrence of capillary active zones or at least to reduce their negative effects. Due to the pressures occurring in steering valves, capillary active zones cause the regions adjacent to the sealing edge to be pressed against the shaft if pressure is acting, which increases friction and wear. By designing the clearance spaces in the context of the manufacturing method according to the invention, the pressure effects are reduced such that the seal produced according to the invention has a very good service life and, furthermore, ensures adequate lubrication.

The manufacturing method according to the invention simplifies the manufacturing process and makes production economical and efficient. This production process can start with a cylindrical base surface in which the sealing edge can then be formed in known manner. The cylindrical surfaces adjacent to the sealing edge must then be processed in such a way that the distance of the cylindrical areas is at least partially increased in relation to the center of the seal. The reference to the center of the seal also corresponds to the reference to the circumference of the sealing edge. Said design can be accomplished, for example, by applying additional material. These areas can also remain from the start when the cylindrical surface is formed. The manufacturing method according to the invention prevents the cylindrical areas adjacent to the sealing edge from being pressed against the shaft when pressure is acting.

Advantageously, all of the adjacent areas are completely recessed so that capillary active zones are completely prevented. However, this fails to increase the height of the sealing edge which would cause an unnecessary weakening of the sealing edge. The recesses can be made spherical, for example.

According to a particularly advantageous proposal of the invention, axially extending notches are made in the adjacent areas up to the edge area.

To attain the aforementioned object with respect to the shaft seal itself, the invention proposes that the sealing edge have a constant angle on both sides over the entire circumference and the adjacent regions next to the sealing edge, viewed from the interior of the sealing edge, be at least partially spaced apart in such a way that these surfaces cannot contact the shaft when pressure is acting.

This technical solution has the effect that the viscous steering gear fluid adhering to the shafts to be sealed is dragged by the corresponding shaft under the area of the seal surface extending in axial direction which necessarily improves lubrication and thus reduces or prevents friction and/or stick slip phenomena caused by the seal. Noise is also automatically reduced.

This drag mechanism is particularly advantageous if, according to one proposal of the invention, the contour of the sealing edge is wave-shaped in axial direction.

A further advantageous proposal is to form notches in the adjacent areas which extend in substantially axial direction. According to a particularly advantageous proposal, the adjacent areas are hollowed out, preferably spherically, without thereby increasing the height of the sealing edge.

Also advantageous are radially extending indentations in the sealing edge. Such indentations promote drag flow into the sealing surface gap and thereby enhance lubrication. According to a particularly advantageous proposal, the shaft seal is given a wave shape in radial direction.

The invention proposes the arrangement of a plurality of sealing edges in the sealing ring zone. These sealing edges can be parallel or they can alternate in relation to their wave shape such that differently oriented waves are arranged next to each other.

The invention provides a simple shaft seal which is economical to produce and, when used in steering gears, particularly suitable to reduce noise and improve lubrication. The shaft seal according to the invention may be used without increasing the axial structural space of a generic rotary disk valve.

Advantageously, the invention proposes that a lip profile for trapping dirt be arranged on the sealing area. Such dirt trapping lip profiles are preferably disposed on the atmospheric side next to the sealing edges. Grease may be introduced between the dirt trapping lip profile and a sealing edge. This is particularly advantageous if, due to the sealing edge contour, the grease can be dragged into the area of the seal surface for lubrication.

Thus, the invention provides a particularly advantageous, novel rotary disk valve with good shaft seal lubrication.

Additional advantages and features of the invention are illustrated by means of the figures and the following description.

DESCRIPTION OF THE DRAWING

FIG. 1 shows a shaft seal 1 in a schematic arrangement which is partially shown in cross section. Shaft seal 1 comprises a sealing ring zone 3, a reinforcing insert 5, a sealing lip 4 with sealing edge cylindrical area 11 and clamping ring 7.

Figure 1:
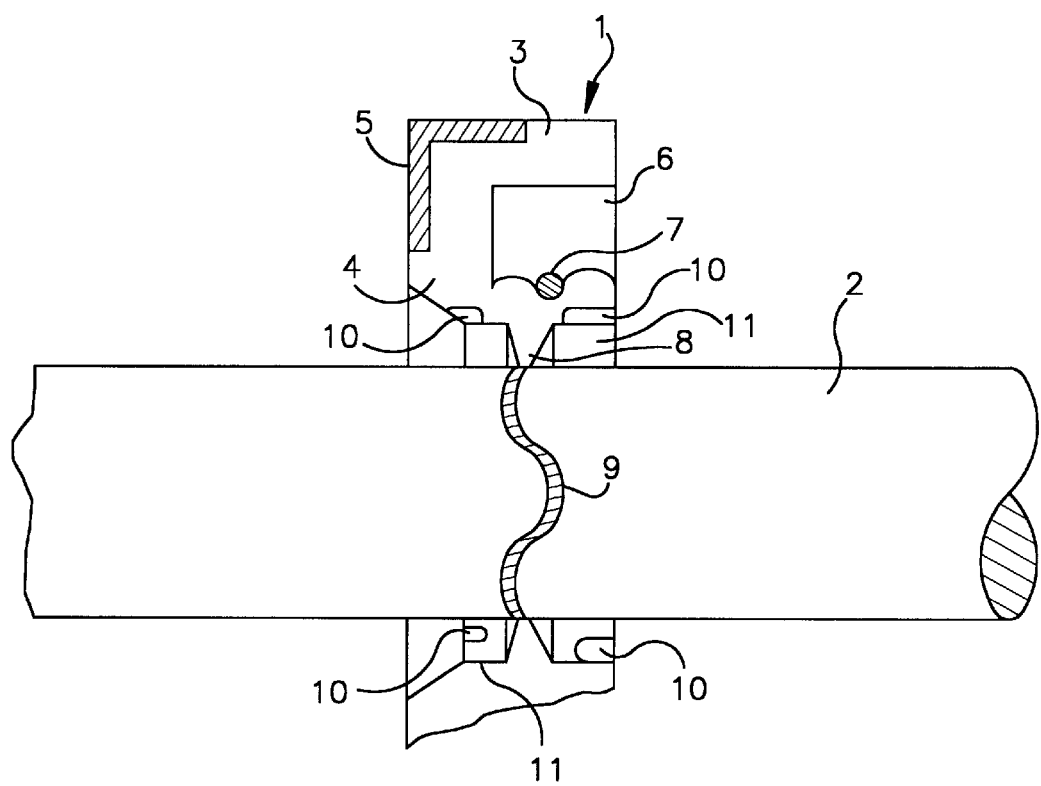
FIG. 1 is a schematic representation of an embodiment of the invention.

Sealing edge 8 is given a wave shape in axial direction. Waves 9 have the effect that lubricant collects in the wave indentations on the lubrication side which is then carried into the seal gap as a result of the rotational movement of shaft 2.

Reference number 10 designates the indentations formed in the adjacent areas. Next to sealing edge 8, whose height is exaggerated for illustration purposes, the manufacturing method according to the invention creates flat adjacent areas, the capillary action of which is interrupted by the introduction of indentations 10.

List of Reference Numbers:

1 shaft seal
2 shaft
3 sealing ring zone
4 sealing lip
5 reinforcement
6 groove
7 clamping ring
8 sealing profile
9 wave
10 indentations
11 cylindrical area

I claim:

1. A shaft seal for sealing a shaft in a hydraulic steering valve, said shaft being centered on a longitudinal axis and having a cylindrical outer surface, said shaft seal comprising:

a sealing ring surrounding the shaft;

said sealing ring having a sealing edge contacting the outer surface of the shaft to form a seal, said sealing edge extending circumferentially around the outer surface of the shaft in a sinusoidal fashion and forming said seal entirely around the outer surface of the shaft, said sealing ring having first and second surfaces which extend radially outward from said sealing edge and which diverge relative to each other as they extend radially outward from said sealing edge, said first and second surfaces extending entirely circumferentially around the outer surface of the shaft, said first surface extending at a constant first angle relative to said sealing edge throughout the entire circumferential extent of said first surface and said second surface extending at a constant second angle relative to said sealing edge throughout the entire circumferential extent of said second surface, said sealing ring having a first cylindrical portion projecting axially away from said first surface in a first direction and a second cylindrical portion projecting axially away from said second surface in a second direction opposite to said first direction, said first and second cylindrical portions being spaced radially from the outer surface of the shaft.

2. The shaft seal of claim 1 wherein said first and second cylindrical regions are completely hollowed out.

3. The shaft seal of claim 1 wherein said first cylindrical region includes notch-shaped indentations to prevent capillary action.

4. The shaft seal of claim 1 wherein second cylindrical region includes notch-shaped indentations to prevent capillary action.

5. The shaft seal of claim 1 wherein said sealing ring includes a dirt-trapping lip portion arranged on an atmospheric side of said sealing edge and extending from said first cylindrical portion of said sealing ring.

6. The shaft seal of claim 5 wherein grease is introduced between said dirt-trapping lip portion and said sealing edge.

7. The shaft seal of claim 1 wherein said sealing ring is made of an elastic material and includes an annular reinforcing insert embedded in the elastic material of said sealing ring.

8. The shaft seal of claim 1 wherein said sealing ring includes an annular groove located radially outward of said sealing edge.

9. The shaft seal of claim 8 wherein said sealing ring includes an annular clamping ring disposed in said annular groove, said clamping ring exerting a radially inwardly directed clamping force on said sealing edge.

* * * * *